United States Patent

[11] 3,603,778

[72] Inventor Raymond T. Walsh
 Florissant, Mo.
[21] Appl. No. 797,508
[22] Filed Feb. 7, 1969
[45] Patented Sept. 7, 1971
[73] Assignee McDonnell Douglas Corporation
 St. Louis, Mo.

[54] TESTING DEVICE FOR LIGHT PANELS
 12 Claims, 3 Drawing Figs.
[52] U.S. Cl. .................................................. 240/2,
 240/52 R, 240/152, 248/27
[51] Int. Cl. ........................................ F21v 21/14,
 F21v 33/00

[50] Field of Search ............................ 356/201–203,
 210, 237, 239, 244; 240/1, 1 EI, 2,
 2.1, 2.18, 8.16, 52, 53, 152; 248/27

[56] References Cited
 UNITED STATES PATENTS
 3,194,954  7/1965  Locke ........................ 240/52 X

*Primary Examiner*—Joseph F. Peters, Jr.
*Attorney*—Gravely, Lieder & Woodruff

ABSTRACT: A testing device for testing light panels having bulb receiving apertures. The testing device includes bulbs which fit into the apertures and are shiftable on a frame so that the testing device is capable of accommodating light panels having their bulb apertures arranged in varying patterns.

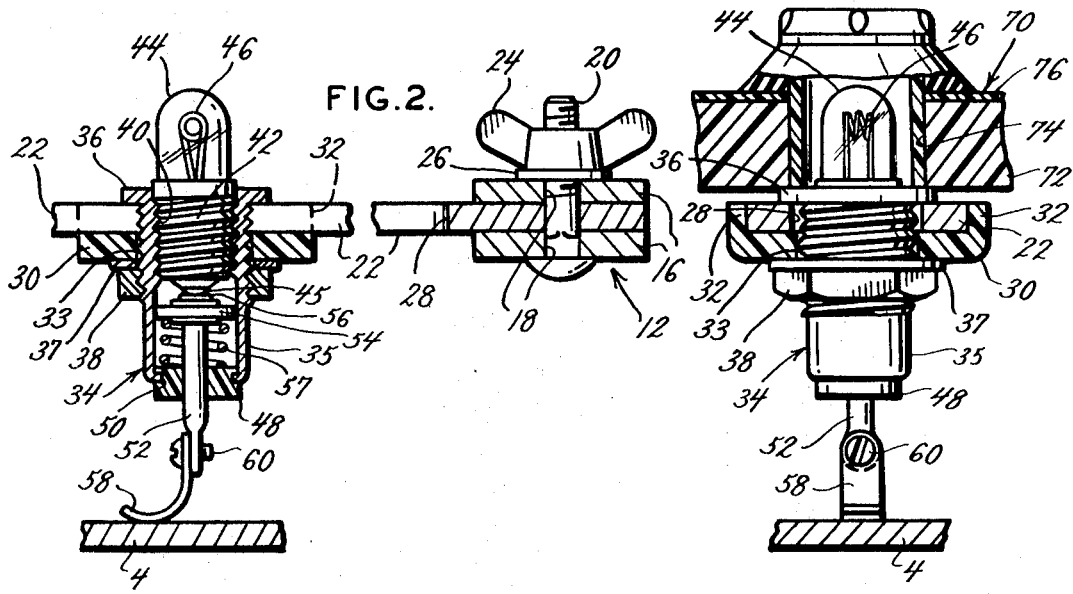
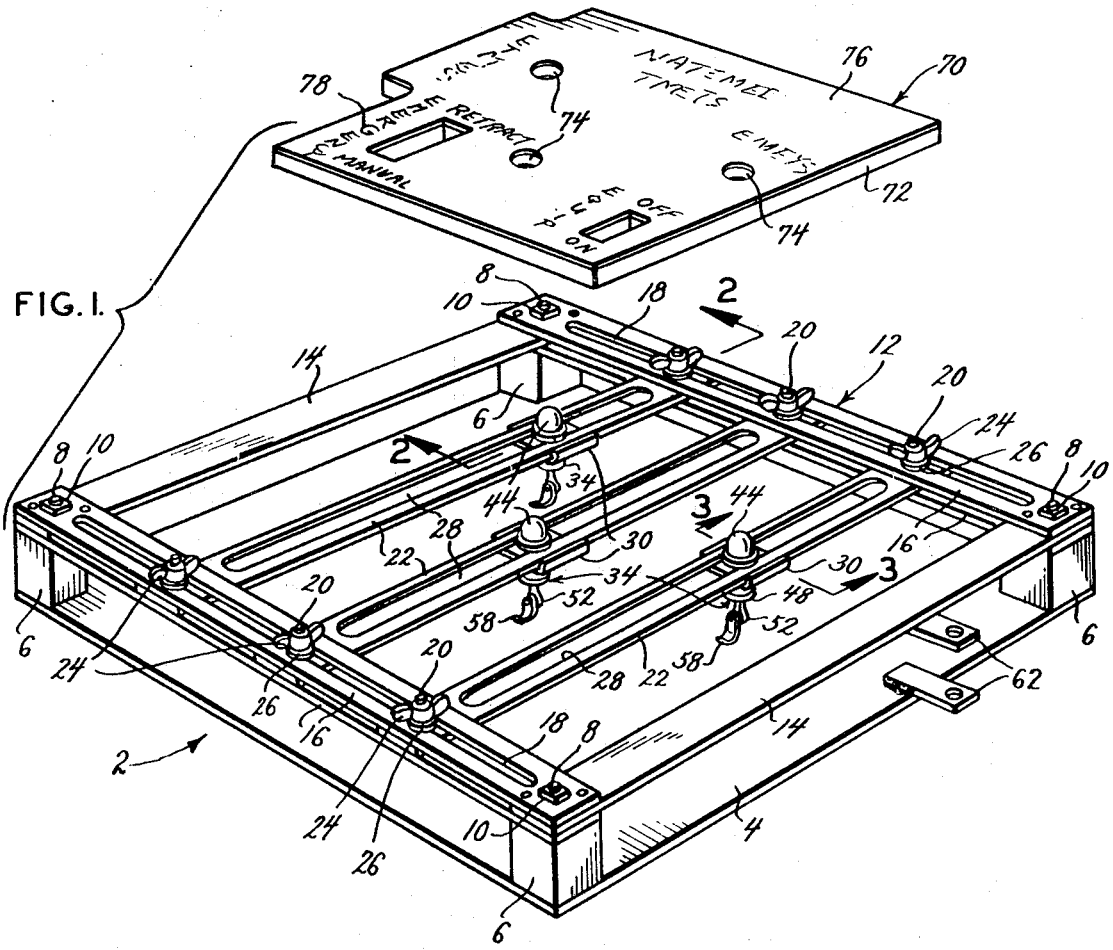

TESTING DEVICE FOR LIGHT PANELS

This invention relates in general to test equipment and more particularly to a testing device for testing the illuminating capabilites of light panels.

Numerous light panels are installed i the cockpits of current aircraft to mark the location of and to supply information necessary to operate the various instruments and controls of the aircraft. Generally each of these light panels consists of a sheet of light conducting plastic approximately one-quarter inch thick having an opaque vinyl resin applied to its outwardly presented surface. The sheet is provided with apertures through which various instruments, switches, and the like are exposed and adjacent to these instruments and switches appropriate indicia are engraved through the vinyl coating and into the light transmitting plastic. Interspersed among the indicia are additional apertures for receiving light bulbs, and these light bulbs are disposed such that their filaments are presented between the inner and outer surfaces of the plastic. Accordingly, the light from the bulbs is transmitted through the plastic to the adjacent indicia which is to be illuminated thereby.

Prior to installation in the aircraft, each light panel is tested to insure that the indicia is clearly legible under conditions of subdued lighting. To conduct these tests, it has heretofore been the practice to construct test plates having rigidly mounted bulbs arranged to register with the bulb receiving apertures of the light panels. Since a single aircraft contains numerous light panels, each having their bulb-receiving apertures arranged in a different pattern, a separate test plate had to be fabricated for each different light panel of the aircraft, entailing considerable expense and creating a storage problem.

One of the principal objects of the present invention is to provide a testing device for different light panels capable of accommodating sources of illumination in varying patterns. Another object is to provide a testing device which is easily and quickly converted for performing tests on light panels having different bulb arrays. A further object is to provide a testing device of the type stated which is simple in construction, easy to operate, and economical to manufacture.

The present invention is embodied in a testing device having sources of illumination which may be shifted to accommodate the varying patterns formed by the means to accommodate them on different light panels. The invention also consists in the parts ad in the arrangements and combinations of parts hereinafter described and claimed. In the accompanying drawings which form part of the specification and wherein like numerals and letters refer to like parts wherever they occur:

FIG. 1 is a perspective view of a testing device constructed in accordance with and embodying the present invention with a light panel disposed above it.

FIG. 2 is a sectional view taken along line 2—2 of FIG. 1; and

FIG. 3 is a sectional view taken along line 3—3 of FIG. 1, but showing the light panel resting on the testing device.

Referring now in detail to the drawings, 2 designates a testing device including a rectangular baseplate 4 which is formed from a rigid electrically conductive substance such as stainless steel sheet. The baseplate 4 at its four corners supports dielectric spacer blocks 6 which project outwardly from one surface thereof, and fastened to the upper ends of the spacer blocks 6 by means of dielectric screws 8 and nuts 10 threaded over the screws 8 is a top frame 12 consisting of side bars 14 and parallel end bars 16, the latter of which constitute frame members arranged in pairs with the bars 16 of each pair being spaced vertically from one another. Both the bars 14 and 16 traverse the spaces between the blocks along side margins of the plate 4 with the latter being perpendicular to the former. Moreover, the ends of the side bars 14 are interposed between the ends of end bars 16 of each pair maintaining them in vertically spaced relation. The dielectric screws 8, which may be formed of nylon, extend through the plate 4, blocks 6 and the stacked ends of the bars 14 and 16, and the nuts 10 thread against the uppermost of the end bars 16 in each pair.

The end bars 16 of each pair are provided with registered longitudinally extending slots 18 which traverse substantially the entire distance between the support blocks 6 connected by them. These slots 18 accommodate screws 20 which extend upwardly through each pair of bars 16 and through the ends of flat light bars 22, the bars 22 in turn extending generally parallel to the side bars 14 over the baseplate 4. Like the side bars 18, the light bars 22 have their ends interposed between the vertically spaced end bars 16 of each pair. The screws 20 are maintained in the slots 18 by wing nuts 24 which, acting through washers 26, bear against the uppermost of the end bars 16. Preferably, the screws 20 immediately beyond their heads have rectangular portions which fit slidably, but nonrotatively in the slots 18 to prevent rotation of the screws 20 as the wing nuts 24 are tightened. By means of this construction the light bars 22 may be shifted transversely relative to the end bars 16 when the wing nuts 24 are loosened.

Each light bar 22 is an elongated member having a longitudinally extending slot 28 and carries an electrically nonconductive cleat 30 (FIG. 3) having side flanges 32 which serve as a guide and gripping means for preventing withdrawal of the cleat 30 from the bar 22. Nevertheless, the flanges 32 do not tightly grip the side edges of the bar 22 so that the cleat 30 is free to shift longitudinally on the light bar 22. The cleat 30 extends completely across the underside of the bar 22 and is provided with a circular aperture 33 which opens upwardly through the slot 28 for reception of a light socket 34 (FIG. 2) having an externally threaded body 35 and being formed from an electrically conductive material. The upper end of the socket body 35 is provided with an integrally formed circular flange 36 which bears against the upper face of the bar 22 so as to prevent the socket 34 from falling through the slot 28 and aperture 33. The socket 34 is maintained in cleat 30 by lock washer 37 and a nut 38, the latter of which threads over the external surface of the socket body 35. Internally, the body 35 is provided with an upwardly opening threaded bore 40 which receives the threaded base 42 of a light bulb 44 having a center contact 45 on its base and a filament 46 presented above the flanges 32 on the cleat 30. At its lower end the socket body 35 is fitted with a dielectric grommet 48 which is secured in place by turning the lower margin of the body 35 inwardly into a peripheral groove 50 on the grommet 48. Projecting through the grommet 48 is a contact post 52 having a dielectric guide washer 54 at its upper end and an end contact 56 located beyond the washer 54 for engagement with the center contact 45 of the bulb 44. The contact post 52 is biased upwardly by a spring 57 disposed around it and interposed between the grommet 48 and the washer 54 so that good electrical contact is established and maintained between the end contact 56 on the post 52 and the center contact 45 on the bulb 44. The lower end of the contact post 52 terminates above the baseplate 4 and is provided with a contact tab 58 formed from an electrically conductive resilient material. The tab 58 is secured to the post 52 by a machine screw 60 and continually bears against the upper surface of the baseplate 4.

Both the baseplate 4 and one of the side bars 14 carry electrical terminals 62 which are placed across a suitable electric energy source corresponding to the voltage rating of the bulbs 44. This potential is impressed across each of the bulbs 44, the current path for each being from the plate 4 to the tab 58 and thence to the contact post 52, from which it enters the center post 45 of the bulb 44 through the end contact 56 on the post. After flowing through the filament 46 of the bulb 44, the current leaves the bulb 44 through its threaded base 42 and enters the socket body 35, from which it is conducted to the bar 22. Since the light bar 22, end bars 16, and side bars 14 are all electrically conductive and in contact with one another, the current will flow through them to the terminal 62 on the side bar 14.

The testing device 2 is particularly useful in testing light panels 70 (FIG. 1) formed from a plastic sheet 72 which is capable of transmitting light such as Lucite marketed by E.I. duPont de Nemours. The plastic sheet 72 is normally about one-quarter inch thick and is provided with at least one, and normally more, bulb apertures 74 which are large enough to accommodate the globe of the bulb 44, that is, the portion in which the filament 46 is contained. The outer or front surface of the plastic sheet 72 is coated with an opaque vinyl resin 76 through which suitable indicia 78 are inscribed into the plastic sheet 72. When a source of light such as the bulbs 44 are presented within the bulb apertures 74 (FIG. 3), the light is transmitted through the plastic sheet 72 to the exposed plastic at the indicia 78 so that the indicia 78 is distinctly illuminated and remains legible under subdued lighting conditions. In this connection, the filament 46 of the bulb 44 should be presented approximately midway between the surfaces of the panel 70 to afford the most efficient transmission of light. The bulb 44 in each bulb aperture 74 is covered by a vented end cap 80 to prevent exposure of the illuminated bulb 44 through the outwardly presented end of the bulb aperture 74.

To test a light panel 70 to determine whether or not it transmits light rays to all the indicia 78 on it, adjacent light bars 22 corresponding in number to the number of bulb apertures 74 in the panel 70 are moved to the approximate lateral spacing of apertures 74 in the panel 72. The remaining light bars 22 are shifted to the side adjacent to the side bars 14. Next the cleats 30 of the bars 22 selected for use are moved longitudinally on their respective bars 22 until the relative spacing between their sockets 34 approximates the relative spacing between the bulb apertures 74 on the panel 70. Thereafter, the panel 70 is lowered toward the frame 12 with the vinyl coating 76 presented upwardly, and at the same time the bars 22 and cleats 30 are adjusted further until the bulbs 44 precisely align with the bulb apertures 74. When this alignment is achieved the panel 70 is lowered further and allowed to rest upon the flanges 36 of the sockets 34 (FIG. 3). The disposition of the bulbs 44 in the sockets 34 is such that in this position the filaments 46 will be located approximately midway between the front and back surfaces of the panel 70 (FIG. 3). The bulbs 44, of course, will supply the light for testing the panel 70. If a group of panels 70 having identical patterns formed by their bulb apertures 74 are scheduled for testing, the wing nuts 24 may be tightened to prevent shifting of the bars 22.

From the foregoing it is apparent that the bulbs 44 may be arranged in any desired pattern merely by shifting the bars 22 and cleats 30, and consequently the testing device 2 may be employed with light panels 70 of varying bulb patterns.

This invention is intended to cover all changes and modifications of the example of the invention herein chosen for purposes of the disclosure which do not constitute departures from the spirit and scope of the invention.

What is claimed is:

1. A testing device for testing light panels having means for accommodating sources of illumination capable of illuminating the panels; said testing device comprising: a frame; an electrically conductive surface presented adjacent to the frame; light bars mounted on the frame and shiftable independently of one another thereon; sockets mounted on the light bars and shiftable thereon in a direction generally perpendicular to the movement of the bars on the frame, whereby the sockets may be moved transversely and longitudinally of the frame, the sockets having contactors which bear against the electrically conductive surface; and light bulbs carried by the sockets and being capable of illuminating the light panel, whereby light panels adapted to accommodate sources of illumination in varying patterns may be tested.

2. A testing device according to claim 1, wherein each bulb includes a base and a center contact on the base; wherein each socket possesses an electrically conductive body which receives the base of the light bulb and an end contact electrically isolated from the body and located in registration with the center contact of the light bulb; and wherein the body of the socket is in electrical contact with the frame and the end contact is in electrical contact with the contactor which bears against conductive surface located adjacent to the frame.

3. A testing device according to claim 2, wherein locking means are provided for optionally securing the light bars rigidly to the frame.

4. A testing device according to claim 2, wherein the frame comprises side bars and pairs of spaced end bars extending between the ends of the side bars; and wherein the ends of the light bars fit between the spaced end bars.

5. A testing device for light panels having front and back faces and bulb apertures which extend into the panels from the back faces thereof and receive light bulbs capable of illuminating the panels; said testing device comprising: a frame; light bars mounted on the frame and shiftable independently of one another thereon; sockets mounted on the light bars and shiftable thereon in a direction generally perpendicular to the movement of the bars on the frame, whereby the sockets may move transversely and longitudinally of the frame so that they can be arranged to register with the bulb apertures in panels of varying patterns; and light bulbs in and engaged with the sockets, the bulbs projecting beyond the sockets and light bars and beings sized for insertion into the apertures of the light panels, the bulbs further having filaments which are disposed approximately midway between the front and back faces of the panel when the back face of the panel rests on the light bars.

6. A testing device for light panels having fixed light positions; said testing device comprising: at least one rigid frame member; a plurality of elongated members mounted on and supported by the frame member; the elongated members projecting outwardly away from the frame member and being further individually shiftable along the frame member so that the spacing between the elongated members may be varied; sockets mounted on the elongated members and being shiftable longitudinally thereon so that the sockets move toward and away from the frame member; bulbs in the sockets; and means connected with the sockets for placing the bulbs across an electrical potential, whereby the sockets and bulbs may be positioned to match the fixed and determined light positions of different light panels so that illuminating characteristics of those panels may be tested.

7. A testing device according to claim 6 wherein two frame members are provided, the frame members being spaced apart and parallel; and wherein the elongated members extend between the frame members.

8. A testing device according to claim 7 wherein the elongated members have longitudinally extending slots; wherein a cleat is engaged with each elongated member such that it will slide longitudinally along the elongated member, but cannot be withdrawn away from the elongated member; and wherein the sockets project through the cleats.

9. A testing device according to claim 7, wherein the elongated members are supported at their ends on the frame members; and wherein locking means are provided for securing each elongated member at at least one of its ends to the frame member supporting that end.

10. A testing device according to claim 6 wherein the means for placing the bulbs across an electrical potential includes an electrically conductive plate located behind the elongated members and a contactor connected to and carried by the socket and bearing against the electrically conductive plate.

11. A testing device according to claim 10 wherein each elongated member is formed from an electrically conductive material; wherein each bulb includes a base having a center contact; wherein each socket has a bore which receives the bulb and includes an end contact in the bore and an electrically conductive side portion isolated electrically from the end contact, the end contact registering with and engaging the center contact on the bulb and further being connected with the contactor which engages the electrically conductive plate so that the center contact on the bulb will be at the same electrical potential as the plate, the electrically conductive side portion being in electrical contact with the side of the base and the elongated bar so that the elongated member on which the socket is mounted and the side of the bulb are at the same electrical potential.

12. A testing device according to claim 11 wherein the frame members are formed from an electrically conductive material.